(12) United States Patent
Chen et al.

(10) Patent No.: US 8,335,252 B2
(45) Date of Patent: Dec. 18, 2012

(54) METHOD AND APPARATUS FOR ENCODING GROUPS OF PICTURES OF A VIDEO SEQUENCE, EACH OF SAID GROUPS INCLUDING AN INTRA ENCODED PICTURE AND MORE THAN TWO ENCODED PICTURES

(75) Inventors: Qu Qing Chen, Beijing (CN); Zhi Bo Chen, Beijing (CN); Xiao Dong Gu, Beijing (CN)

(73) Assignee: Thomson Licensing (FR)

( * ) Notice: Subject to any disclaimer, the term of this patent is extended or adjusted under 35 U.S.C. 154(b) by 477 days.

(21) Appl. No.: 12/733,265

(22) PCT Filed: Sep. 7, 2006

(86) PCT No.: PCT/CN2006/002308
§ 371 (c)(1),
(2), (4) Date: Mar. 5, 2009

(87) PCT Pub. No.: WO2008/031263
PCT Pub. Date: Mar. 20, 2008

(65) Prior Publication Data
US 2011/0044386 A1    Feb. 24, 2011

(51) Int. Cl.
*H04N 7/12* (2006.01)
(52) U.S. Cl. .................................. 375/240.12
(58) Field of Classification Search ............... None
See application file for complete search history.

(56) References Cited

U.S. PATENT DOCUMENTS 5,510,844 A * 4/1996 Cash et al. ............... 375/240.28
5,699,128 A * 12/1997 Hayashi .................... 348/699
(Continued)

FOREIGN PATENT DOCUMENTS
JP        10-313462       11/1998
(Continued)

OTHER PUBLICATIONS

Claypool, M et al., "Using interleaving to meliorate the effects of packet loss in a video stream", Multimedia Signal Processing, 2002 IEEE Workshop on Dec. 9-11, 2002, Piscataway, NJ, USA, pp. 508-513.

(Continued)

*Primary Examiner* — Thai Tran
*Assistant Examiner* — Sunghyoun Park
(74) *Attorney, Agent, or Firm* — Jack Schwartz and Associates, PLLC

(57) ABSTRACT

In known video coding standards there are basically three types of pictures: I, P and B. Video sequences are usually coded in a group of picture structure wherein several P or B pictures are coded following one I picture. However, this GOP structure has some disadvantages with respect to error resilience and storage medium recording. If a P picture is lost e.g. due to transmission channel error, then the subsequent P pictures can not be reconstructed correctly, and the error will propagate temporally and cause unpleasing artifacts. This GOP structure is designed for forward play only and makes complicated a reverse play operation. According to the invention, a reversible GOP structure is used for the video encoding and decoding. The RGOP structure contains both, a forward encoding chain and a backward encoding chain. Each picture in the RGOP structure is assigned to only one of these chains and the video pictures of adjacent RGOP chains are interleaved.

24 Claims, 3 Drawing Sheets

U.S. PATENT DOCUMENTS

| | | |
|---|---|---|
| 6,744,924 B1 | 6/2004 | Hannuksela et al. |
| 2001/0008574 A1* | 7/2001 | Miyashita et al. ............... 386/68 |
| 2003/0112871 A1* | 6/2003 | Demos .................... 375/240.15 |
| 2003/0138043 A1* | 7/2003 | Hannuksela ............. 375/240.08 |
| 2004/0013312 A1* | 1/2004 | Kajiwara ..................... 382/240 |
| 2004/0017425 A1* | 1/2004 | Koguchi ......................... 347/40 |
| 2004/0073936 A1* | 4/2004 | Kurauchi ........................ 725/90 |
| 2004/0223723 A1 | 11/2004 | Lin et al. |
| 2006/0045491 A1 | 3/2006 | Adolph et al. |
| 2006/0120464 A1* | 6/2006 | Hannuksela ............. 375/240.27 |

FOREIGN PATENT DOCUMENTS

| | | |
|---|---|---|
| JP | 11-098513 | 4/1999 |
| JP | 2002-529978 | 9/2002 |
| WO | WO02-01882 | 1/2002 |
| WO | WO 03063505 A1 * | 7/2003 |
| WO | WO2004-100523 | 11/2004 |
| WO | WO2005-002192 | 1/2005 |

OTHER PUBLICATIONS

Tao, Fang et al., "An error-resilient GOP structure for Robust Video transmission", IEEE Transactions on Multimedia, vol. 7, No. 6, Dec. 2005, pp. 1131-1138.

Search Report Dated Jun. 6, 2007.

* cited by examiner

METHOD AND APPARATUS FOR ENCODING GROUPS OF PICTURES OF A VIDEO SEQUENCE, EACH OF SAID GROUPS INCLUDING AN INTRA ENCODED PICTURE AND MORE THAN TWO ENCODED PICTURES

This application claims the benefit, under 35 U.S.C. §365 of International Application PCT/CN2006/002308, filed Sep. 7, 2006, which was published in accordance with PCT Article 21(2) on Mar. 20, 2008 in English.

The invention relates to a method and to an apparatus for encoding groups of pictures of a video sequence, each of said groups including an intra encoded picture and more than two predicted encoded pictures, using forward prediction as well as backward prediction.

BACKGROUND

In known MPEG/H.26x video coding standards (e.g. MPEG-1, MPEG-2, MPEG-4, MPEG-4 AVC/H.264, H.263, VC-1), there are basically three types of pictures: I (intraframe coded) pictures, P (interframe coded) pictures and B (bi-directionally predicted) pictures. An I picture does not use other pictures as reference so that it can be used as re-synchronisation point in error-prone video transmission. It can also be used as random access point in video editing and fast forward/backward play. A P picture can use one or more previous pictures as reference so that it increases the coding efficiency due to the prediction. B pictures can use previous and subsequent pictures for prediction and further improve the coding efficiency.

Figure 1:
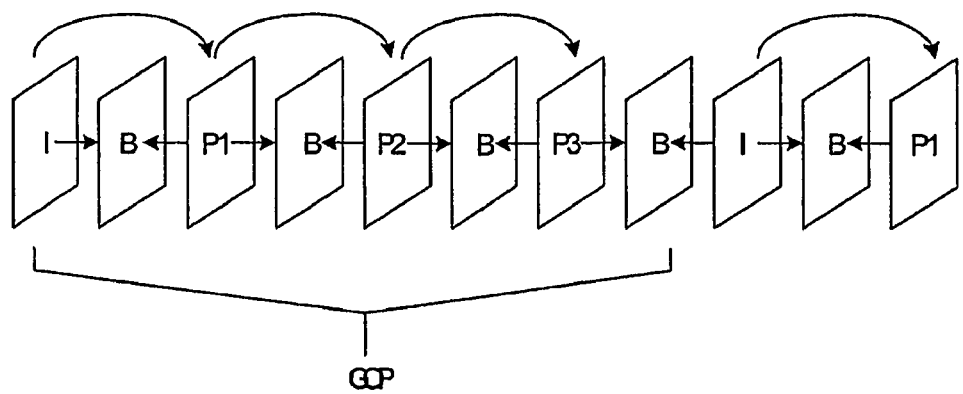

Video sequences are usually coded in a group of picture (GOP) structure, wherein several P (P1, P2, P3) and/or B pictures are coded following one I picture, as is shown in FIG. 1. However, this GOP structure has some disadvantages especially in the following two kinds of applications:

a) Error Resilience

If picture P1 is lost e.g. due to transmission channel error, then the subsequent P pictures can not be reconstructed correctly, and the error will propagate temporally and cause some unpleasing artefacts. Although error concealment can be employed at decoder side, it can not remove the artefact very well because some vital information is lost.

b) Storage Medium Recording, e.g. on DVD or VCR DVD (digital versatile disc) or VCR (video cassette recorder) usually require functions like forward, backward, stop, pause, fast forward, fast backward and random access. However, the known MPEG GOP structure is designed for forward play only and makes complicate the reverse play operation. A simple fast backward play can be achieved by only accessing I pictures in backward direction, but if smoother picture-by-picture reverse-play is desired, much more complexity, bandwidth, and/or storage buffer will be required. For example, one can decode the GOP up to the current frame, and then go back to decode from the beginning of the GOP again up to the next frame to be displayed. However, this requires high bandwidth of throughput. Otherwise a great deal of storage buffer is needed if the bit stream is expected to be decoded only once.

Figure 2:
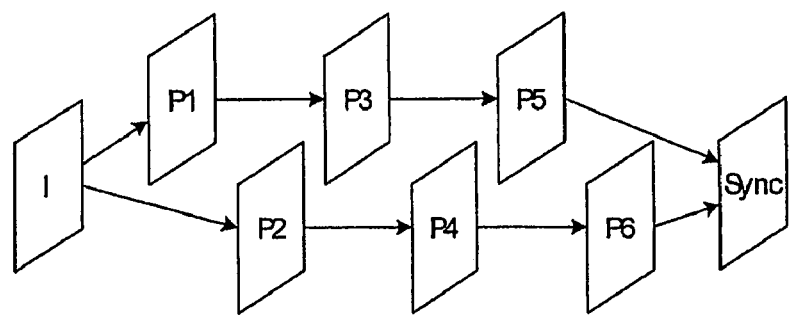

Some different GOP structures have been proposed to solve the above problems. For error resilience, a video redundancy coding method has been disclosed by S. Wenger, G. Knorr, J. Ott, F. Kossentini, "Error Resilience Support in H.263+", IEEE Transactions on Circuits and Systems for Video Technology, Vol. 8, No. 7, November 1998, for H.263+ codec applications. This method divides the video sequences into two or more chains in such a way that every picture is assigned to one of the chains. Each chain is coded independently. A GOP structure using two prediction chains is shown in FIG. 2. In case one of these chains is damaged because of a packet loss, the remaining chains stay intact and can be decoded and displayed. It is possible to continue a decoding of the damaged chain, or do some error concealment, by using the information in the other undamaged chain, which leads to only a slight subjective quality degradation. It is also possible to stop the decoding of the damaged chain, and this will only lead to a drop of the frame rate, which has much less effect on subjective quality than other error artefacts. In both cases the resulting error resilient performance is much better than for the FIG. 1 GOP prediction structure. However, this structure does not support the function of reverse-play.

For reverse replay, C. W. Lin, J. Zhou, J. Youn, M. T. Sun, "MPEG Video Streaming with VCR Functionality", IEEE Transactions on Circuits and Systems for Video Technology, Vol. 11, No. 3, March 2001, have proposed to add a reverse-encoded bit stream in the server, i.e. in the encoding process. Upon finishing the encoding and reaching the last picture of the video sequence, the video pictures are encoded in the reverse order to generate a reverse-encoded bit stream. If the server has only the forward encoded bit stream (i.e. the original sequence is unavailable), the forward bit stream can be decoded up to two GOPs each time in the reverse direction (i.e. from the last GOP to the first GOP) and the video sequence is then re-encoded in the reverse order. The generation of the reverse-encoded bit stream is performed off-line. However, each picture is encoded twice and hence the bit stream size is almost doubled.

T. Fang, L. P. Chau, "An error-resilient GOP structure for robust video transmission", IEEE Transactions on Multimedia, Vol. 7, No. 6, December 2005, have proposed a new GOP structure which takes both error resilience and VCR reverse-play into account. By putting the I picture ($I_n$) in the middle of each GOP, the predicted P pictures are partitioned into two parts: half of them ($P_{n-1}, \ldots, P_{m+i+1}$) are backward-predicted encoded and half of them ($P_{n+1}, \ldots, P_{n+j}$) are forward-predicted encoded, as shown in the corresponding GOP structure (without B pictures) in FIG. 3. The subscript is the temporal number of the picture in the original video sequence, where the subscripts are monotonously increasing as $i>1$, $n-1>m+i+1$, $j>1$, and $k-1>n+j+1$. If B pictures are included, the structure will not be virtually affected. Obviously, if one P picture is corrupt, at most it will affect only half of the GOP, while the other half of the GOP which is arranged at the other side of picture $I_n$ will not be affected. In fact, this GOP structure is another form of two prediction chains, wherein one chain is forward and the other is backward.

On one hand, this GOP structure makes the reverse-play partly easy since one half of the P frames in the GOP are already reverse-encoded. On the other hand, this GOP structure still has disadvantages in both, the error resilience and the reverse-play. If $P_{m+1}$ is lost, then $P_{m+1}$ to $P_{m+i}$ are corrupt and error artefacts will be noticed in this time period. Although the picture chain $P_{n-1}$ to $P_{m+i+1}$ may be received correctly, it will not offer help for decoding the pictures of the time period from $P_{m+1}$ to $P_{m+i}$. Therefore this GOP structure can not provide an error resilient performance as good as the GOP structure depicted in FIG. 2. Further, this GOP structure can not provide a continuous reverse-play function because half of the consecutive P frames are still forward encoded. In detail, the processing order for reverse-play is: $I_k \to P_{k-1} \to \ldots \to P_{n+j+1} \to I_n \to P_{n-1} \to \ldots \to P_{m+i+1} \to I_m \ldots$ Hence, there are gaps during $P_{n+j}$ to $P_{n+1}$ and $P_{m+i}$ to $P_{m+1}$ that will cause a big jitter in the reverse play. If the pictures from $P_{n+j}$ to $P_{n+1}$ and $P_{m+i}$ to $P_{m+1}$ really need to be displayed, then normal multi-pass decoding or huge buffering is necessary, which is the same problem like in the standard GOP structure.

INVENTION

A problem to be solved by the invention is to provide a GOP structure that increases the error resilience for video transmission and facilitates a fluent reverse-play function. This problem is solved by the method disclosed in claims 1 and 3. Apparatuses that utilise these methods are disclosed in claims 2 and 4.

According to the invention, a reversible GOP (RGOP) structure is used for the video encoding and decoding. The RGOP structure contains both, a forward encoding chain and a backward encoding chain. Each picture in the RGOP structure is assigned to only one of these chains and the video pictures of the two chains are interleaved.

This RGOP structure improves the error resilience because, if one prediction chain is corrupt and the other prediction chain is intact, the video sequence can still be decoded and displayed fluently without any noticeable artefact, as is explained below. This RGOP structure also provides an easy and fluent reverse-play function for recording applications.

The additional cost of the inventive processing is a small decrease of the coding efficiency due to the prediction in the encoding not using the nearest frame. But the redundant bits are valuable for increasing the error resilience or recovery.

In principle, the inventive encoding method is suited for encoding groups of pictures of a video sequence, each of said groups including an intra encoded picture and more than two predicted encoded pictures, wherein one part of said predicted encoded pictures is backward predicted encoded starting from said intra encoded picture and the other part of said predicted encoded pictures is forward predicted encoded starting from said intra encoded picture, whereby pictures are omitted in these forward and backward predicted encoded picture chains and whereby every two adjacent groups of pictures of said video sequence are arranged in an overlapping manner such that said missing pictures in the forward and backward predicted encoded picture chains in a current groups of pictures are included in an interleaved manner in one of said adjacent overlapping groups of pictures.

In principle the inventive encoding apparatus is suited for encoding groups of pictures of a video sequence, each of said groups including an intra encoded picture and more than two predicted encoded pictures, said apparatus including means being adapted for backward predicted encoding starting from said intra encoded picture one part of said predicted encoded pictures, and for forward predicted encoding starting from said intra encoded picture the other part of said predicted encoded pictures, whereby pictures are omitted in these forward and backward predicted encoded picture chains and whereby every two adjacent groups of pictures of said video sequence are arranged in an overlapping manner such that said missing pictures in the forward and backward predicted encoded picture chains in a current groups of pictures are included in an interleaved manner in one of said adjacent overlapping groups of pictures.

In principle, the inventive decoding method is suited for decoding groups of pictures of a video sequence, each of said groups including an intra encoded picture and more than two predicted encoded pictures, wherein one part of said predicted encoded pictures was backward predicted encoded starting from said intra encoded picture and the other part of said predicted encoded pictures was forward predicted encoded starting from said intra encoded picture and said decoding of said pictures is performed in a corresponding order, whereby pictures were omitted in these forward and backward predicted encoded picture chains and whereby every two adjacent groups of pictures of said video sequence were arranged in an overlapping manner such that said missing pictures in the forward and backward predicted encoded picture chains in a current groups of pictures were included in an interleaved manner in one of said adjacent overlapping groups of pictures, and in said decoding the correspondingly decoded pictures are assembled for the decoded output signal in the original picture order of said video sequence.

In principle the inventive decoding apparatus is suited for decoding groups of pictures of a video sequence, each of said groups including an intra encoded picture and more than two predicted encoded pictures, wherein one part of said predicted encoded pictures was backward predicted encoded starting from said intra encoded picture and the other part of said predicted encoded pictures was forward predicted encoded starting from said intra encoded picture, whereby pictures were omitted in these forward and backward predicted encoded picture chains and whereby every two adjacent groups of pictures of said video sequence were arranged in an overlapping manner such that said missing pictures in the forward and backward predicted encoded picture chains in a current groups of pictures were included in an interleaved manner in one of said adjacent overlapping groups of pictures, said apparatus including means being adapted for decoding the pictures of said groups of pictures in a corresponding order and assembling the correspondingly decoded pictures for the decoded output signal in the original picture order of said video sequence.

Advantageous additional embodiments of the invention are disclosed in the respective dependent claims.

DRAWINGS

Figure 3:
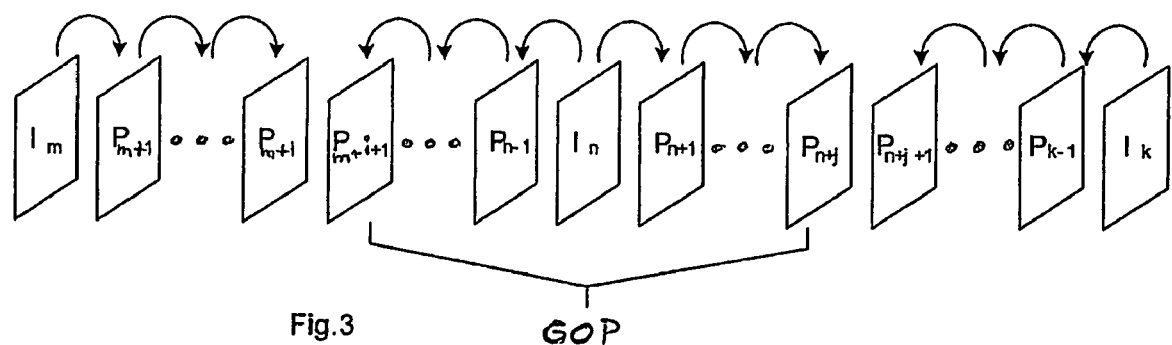
Figure 4:
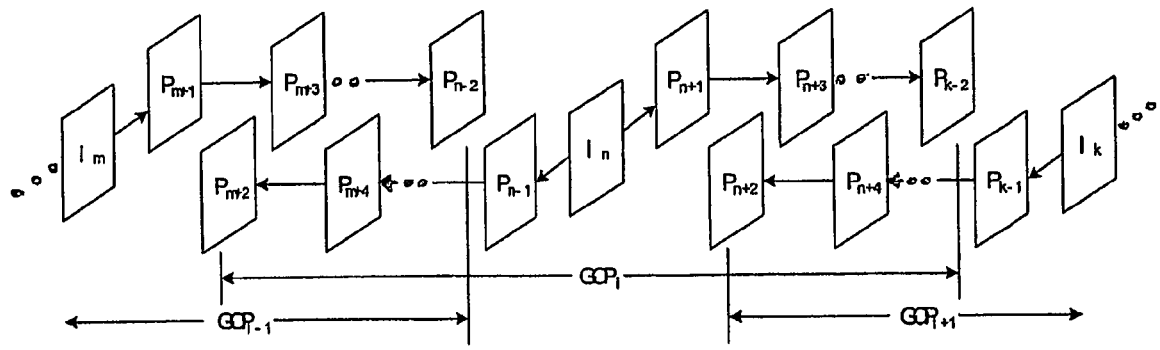
Figure 5:
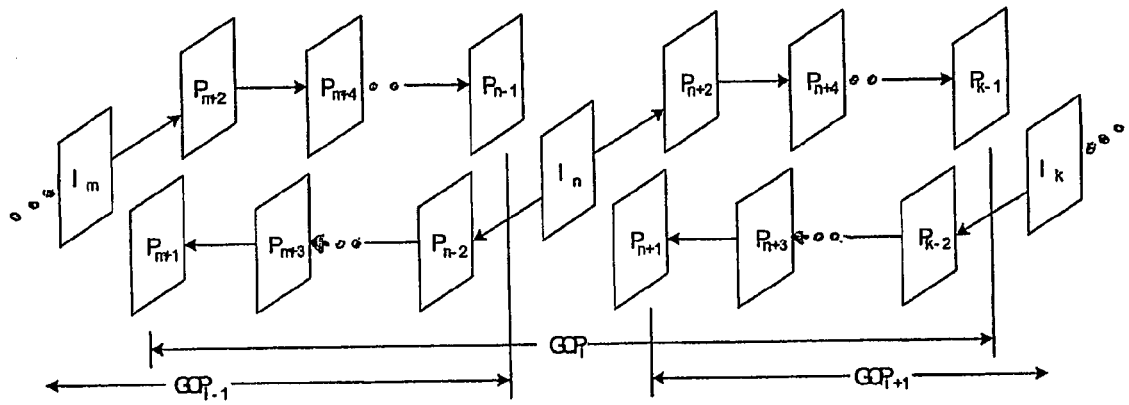
Figure 6:
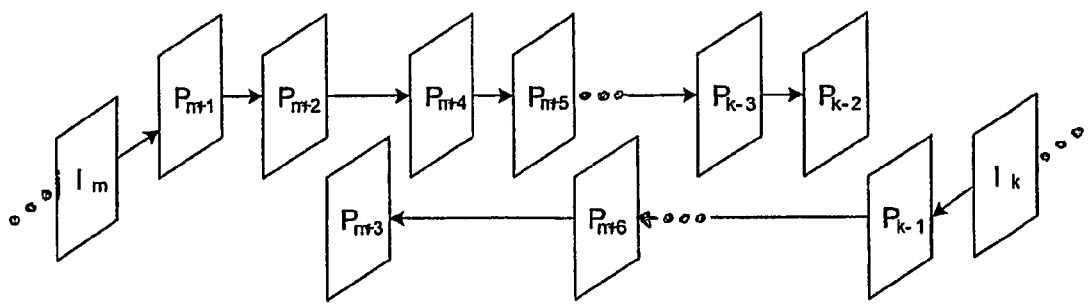
Figure 7:
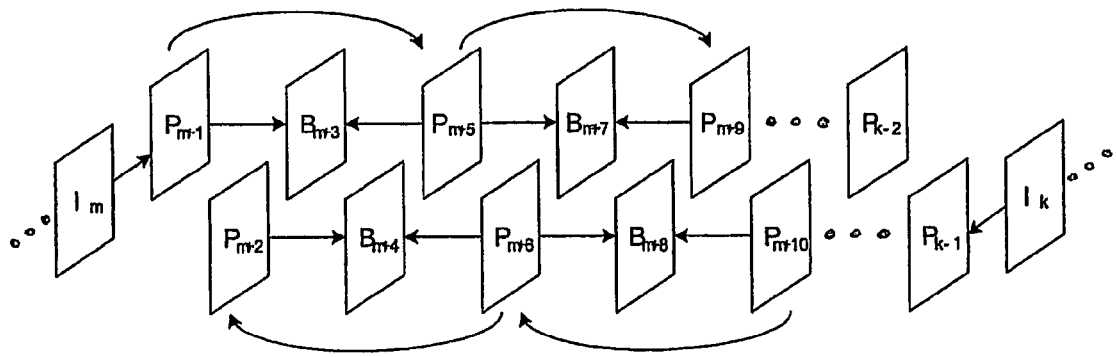
Figure 8:
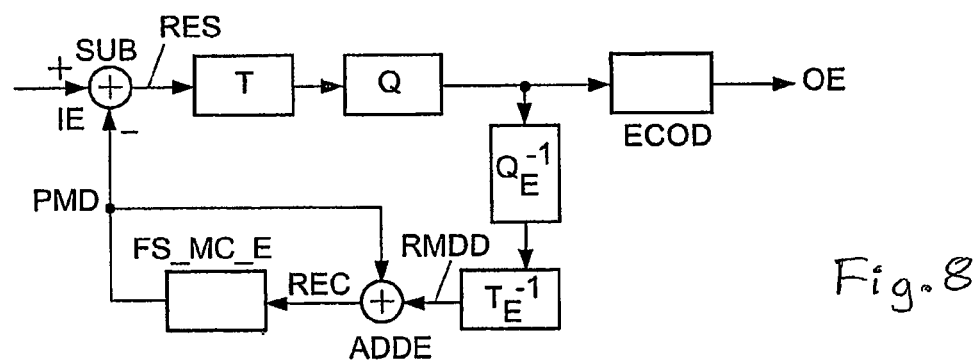
Figure 9:
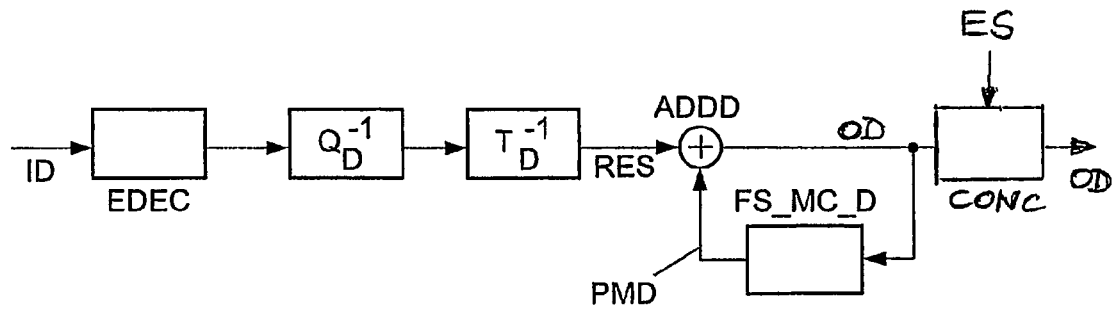

Exemplary embodiments of the invention are described with reference to the accompanying drawings, which show in:

FIG. 1 typical MPEG GOP Structure;
FIG. 2 known GOP structure with two prediction chains;
FIG. 3 known GOP structure in which the I picture is arranged in the middle of the GOP;
FIG. 4 inventive RGOP structure;
FIG. 5 another example of an inventive RGOP structure;
FIG. 6 inventive RGOP structure with uneven interleaving;
FIG. 7 inventive RGOP structure with B pictures included;
FIG. 8 example of an inventive encoder;
FIG. 9 example of an inventive decoder.

EXEMPLARY EMBODIMENTS

In the RGOP structure, a group of temporally consecutive pictures are interleaved re-scheduled into two prediction chains. That is, half of the pictures are forward encoded by prediction initially from a previous I picture, while the rest of the pictures are backward encoded by prediction initially from a later I picture. Preferably, the bit stream of the reverse pictures is sent following the bit stream of the forward encoded pictures, to form a new RGOP.

A typical RGOP structure is shown in FIG. 4. In the original video sequence containing the pictures $I_m$, $P_{m+1}$, $P_{m+2}$, $P_{m+3}$, $P_{m+4}$, ..., $P_{n-2}$, $P_{n-1}$, $I_n$, $P_{n+1}$, $P_{n+2}$, $P_{n+3}$, $P_{n+4}$, ..., $P_{k-2}$, $P_{k-1}$, $I_k$, ..., and having a length of two GOPs, the pictures $P_{m+2}$, $P_{m+4}$, ..., $P_{n-1}$ are selected for the reverse prediction encoding chain that starts from picture $I_n$ in backward direction, whereas the pictures $P_{n+1}$, $P_{n+3}$, ..., $P_{k-2}$ are selected for the forward prediction encoding chain that starts from picture $I_n$ in forward direction. These two chains together build up a new $RGOP_i$.

Correspondingly, pictures $P_{m+1}, P_{m+3}, \ldots, P_{n-2}$ form the forward prediction encoded chain in the previous $RGOP_{i-1}$ while pictures $P_{n+2}, P_{n+4}, \ldots, P_{k-1}$ form the backward prediction encoded chain in the following $RGOP_{i+1}$, i.e. each RGOP contains a backward prediction encoding chain and a forward prediction encoding chain. The neighbouring RGOPs and their pictures are interleaved, i.e. within a GOP length section of the video sequence every second picture belongs to the current $RGOP_i$ and the intermediate pictures belong to the corresponding adjacent $RGOP_{i-1}$ or $RGOP_{i+1}$.

The bit stream of each RGOP contains an I picture, a backward prediction encoded chain, and a forward prediction encoded chain. This can be denoted as {I, {backward prediction encoded chain}, {forward prediction encoded chain}}. For the case of FIG. 4, the transmission order is: $\{RGOP_{i-2}\}$, $\{I_m, \{\ldots\}, \{P_{m+1}, P_{m+3}, \ldots P_{n-2}\}\}$, $\{I_n, \{P_{n-1}, \ldots, P_{m+4}, P_{m+2}\}, \{P_{n+1}, P_{n+3}, \ldots, P_{k-2}\}\}$, $\{I_k, \{P_{k-1}, \ldots, P_{n+4}, P_{n+2}\}, \{\ldots\}\}$, $\{RGOP_{i+2}\}$.

For error resilience or recovery, if one picture (e.g. $P_{m+1}$) in one prediction chain is lost, then turn to the next I picture (e.g. $I_n$) which is in the next GOP, and then decode backwards or reversely. Hence $P_{n-1}, \ldots, P_{m+4}, P_{m+2}$ can be decoded correctly. By using these correctly decoded pictures, pictures $\{P_{m+1}, P_{m+3}, \ldots, P_{n-2}\}$ can be better recovered by error concealment or interpolation schemes. Even if error concealment algorithms are not used, a lower frame rate sequence $\{P_{m+2}, P_{m+4}, \ldots, P_{n-1}\}$ can be displayed instead without producing much annoying artefacts.

Moreover, this RGOP structure has a good capacity to overcome burst errors which appear widely in wireless transmission. Pictures $P_{m+1}, P_{m+2}, P_{m+3}, P_{m+4}, \ldots, P_{n-2}, P_{n-1}$, which are continuous in temporal direction, are assigned to different RGOPs, so that there is a delay between the transmission of $\{P_{m+1}, P_{m+3}, \ldots, P_{n-2}\}$ and the transmission of $\{P_{n-1}, \ldots, P_{m+4}, P_{m+2}\}$. When a burst error happens in one prediction chain, the other chain is usually intact, and hence the quality of the decoded video sequence can be nearly kept.

Also, the inventive RGOP structure provides forward play as well as reverse play easily because it contains a forward prediction chain and a backward prediction chain.

FIG. 5 depicts a second embodiment of the inventive RGOP structure having the same features like that depicted in FIG. 4. Pictures $\{P_{m+2}, P_{m+4}, \ldots, P_{n-1}\}$ and $\{P_{n+2}, P_{n+4}, \ldots, P_{k-1}\}$ are forward prediction encoded to form a forward prediction chain while pictures $\{P_{n-2}, \ldots, P_{m+3}, P_{m+1}\}$ and $\{P_{k-2}, \ldots, P_{n+3}, P_{n+1}\}$ are reverse prediction encoded to form a backward prediction chain. The transmission order is $\{RGOP_{i-2}\}$, $\{I_m, \{\ldots\}, \{P_{m+2}, P_{m+4}, \ldots, P_{n-1}\}\}$, $\{I_n, \{P_{n-2}, \ldots, P_{m+3}, P_{m+1}\}, \{P_{n+2}, P_{n+4}, \ldots, P_{k-1}\}\}$, $\{I_k, \{P_{k-2}, \ldots, P_{n+3}, P_{n+1}\}, \{\ldots\}\}$, $\{RGOP_{i+2}\}$.

FIG. 6 shows an inventive RGOP structure in which the interleaving is uneven. That is, the number of pictures in the forward prediction chain is higher than the number of pictures in the backward prediction chain. Pictures $\{P_{m+1}, P_{m+2}, P_{m+4}, P_{m+5}, \ldots, P_{k-3}, P_{k-2}\}$ are forward prediction encoded to form the forward prediction chain while pictures $\{P_{k-1}, \ldots, P_{m+6}, P_{m+3}\}$ are reverse prediction encoded to form the backward prediction chain. This structure benefits forward play more than reverse play. The proportion of forward encoded pictures to reverse encoded pictures can vary according to the application requirements.

Multiple reference frames can be employed in each of the forward prediction and backward prediction chains. But the pictures in the forward prediction chain can not predict from the backward prediction chain pictures and vice versa.

The inventive RGOP structure can be generalised to cases where the video sequence includes B pictures. An example is shown in FIG. 7. It is useful for error resilient video coding and for DVD and VCR applications. Pictures $\{P_{m+1}, B_{m+3}, P_{m+5}, B_{m+7}, P_{m+9}, \ldots, P_{k-2}\}$ are forward prediction encoded to form the forward prediction chain while pictures $\{P_{k-1}, \ldots, P_{m+10}, B_{m+8}, P_{m+6}, B_{m+4}, P_{m+2}\}$ are reverse prediction encoded to form the backward prediction chain. The chains can also start and/or end with corresponding B pictures.

The video data input signal IE of the pixel block encoder in FIG. 8 contains macroblock data for encoding. The pictures are processed in a manner corresponding to that described in FIG. 6 or 7. In the case of intraframe video data, a subtractor SUB simply allows these to pass. They are processed in transform means T and quantising means Q and are fed to an entropy encoder ECOD, which outputs the encoder output signal OE. ECOD can, for example, carry out Huffman coding for the coefficients and add header information and motion vector data. In the case of interframe video data, predicted block or macroblock data PMD are subtracted from the input signal IE in the subtractor SUB and the difference data are fed to the entropy encoder ECOD via the transform means T and the quantising means Q. The output signal of Q is also processed in inverse quantising means $Q_E^{-1}$, the output signal of which is fed via inverse transform means $T_E^{-1}$ to the combiner ADDS in the form of reconstructed block or macroblock difference data RMDD. The output signal of ADDE is buffer-stored in a frame store in motion estimation and compensation means FS_MC_E, which carry out motion compensation for reconstructed block or macroblock data in the direction as described in FIG. 6 or 7, and output block or macroblock data PMD predicted in this way to the subtracting input of SUB and to the other input of the combiner ADDE. The quantising means Q and the inverse quantising means $Q_E^{-1}$ can be controlled by the occupancy level of the encoder buffer ENCB. The output signal of ADDS is output by the encoder COD as reconstructed frame data REC. The output signal of SUB is output by the encoder COD as residual frame data RES.

In FIG. 9, the encoded pixel data input signal ID is fed via entropy decoder means EDEC, inverse quantising means $Q_D^{-1}$ and inverse transform means $T_D^{-1}$ as residual frame data RES to a combiner ADDD, which outputs the reconstructed pixel data output signal OD. The pictures are processed in a manner corresponding to that described in FIG. 6 or 7. EDEC can, for example, carry out Huffman decoding for the coefficients and decode and/or evaluate header information and motion vector data. $Q_E^{-1}$, $Q_D^{-1}$, $T_E^{-1}$, $T_D^{-1}$ and EDEC have a function which is the corresponding inverse of the function of Q, T and ECOD. The output signal of ADDD is buffer-stored in a frame store in motion compensation means FS_MC_D. FS_MC_D effects a motion compensation for reconstructed block or macroblock data, in the direction as described in FIG. 6 or 7. The block or macroblock data PMD predicted in FS_MC_D are passed to the second input of the combiner ADDE in the case of interframe-decoded block or macroblock data. In the case of intraframe-decoded block or macroblock data, the combiner ADDD simply passes on the output signal from $T_D^{-1}$. In case an error signal ES indicates that a picture (i.e. at least one picture) in a backward or forward prediction chain has not been received correctly, the remaining pictures in the corresponding prediction chain can not be decoded but concealed or interpolated using the corresponding interleaved decoded pictures from the adjacent group of pictures to generate the missing output pictures of said video sequence (IE), or the remaining pictures in the corresponding prediction chain are not decoded but the decoding continues with the following intra encoded picture and the current chain output signal OD can be adapted correspondingly in its frame rate.

The transform and the inverse transform in FIGS. 8 and 9 can be a DCT or inverse DCT, respectively.

The invention claimed is:

1. A method for encoding groups of pictures of a video sequence, each of said groups of pictures including a single intra encoded picture and more than two predicted encoded pictures located in backward direction as well as in forward direction from said single intra encoded picture, said method comprising the steps of:
    intra encoding said single intra encoded picture to be intra encoded of a current group of pictures;
    backward predicted encoding a first part of predicted encoded pictures of said current group of pictures, starting from said intra encoded picture of said current group of pictures, and forward predicted encoding an other part of said predicted encoded pictures of said current group of pictures, starting from said intra encoded picture of said current group of pictures, wherein pictures are omitted in these forward and backward predicted encoded picture chains, and
    arranging every two adjacent groups of pictures of said video sequence in an overlapping manner such that missing pictures in the backward predicted encoded picture chain in said current group of pictures are included in an interleaved manner as a forward predicted encoded picture chain in a preceding group of pictures, and missing pictures in the forward predicted encoded picture chain in said current group of pictures are included in an interleaved manner as a backward predicted encoded picture chain in a following group of pictures.

2. The method according to claim 1, wherein said interleaving is uneven.

3. The method according to claim 1, wherein said forward and backward predicted encoded picture chains include bi-directionally predicted encoded pictures.

4. The method according to claim 1 wherein, if at least one picture in said backward or forward predicted encoded picture chains is received with errors, the remaining pictures in the corresponding prediction chain are not decoded but the decoding continues with the following intra encoded picture.

5. The method according to claim 4, wherein the frame rate of said decoded output signal is adapted correspondingly.

6. The method according to claim 1 wherein, if at least one picture in said backward or forward predicted encoded picture chains is received with errors, the remaining pictures in the corresponding prediction chain are not decoded but concealed or interpolated using the corresponding interleaved decoded pictures from the adjacent group of pictures.

7. A method for decoding groups of pictures of a video sequence, each of said groups of pictures including a single intra encoded picture and more than two predicted encoded pictures located in backward direction as well as in forward direction from said single intra encoded picture, wherein a single picture to be intra encoded of a current group of pictures was intra encoded and a first part of said predicted encoded pictures of a current group of pictures was backward predicted encoded starting from said intra encoded picture of said current group of pictures, and the other part of said predicted encoded pictures of said current group of pictures was forward predicted encoded starting from said intra encoded picture of said current group of pictures, whereby pictures were omitted in these forward and backward predicted encoded picture chains and whereby every two adjacent groups of pictures of said video sequence were arranged in an overlapping manner such that missing pictures in the backward predicted encoded picture chain in said current group of pictures were included in an interleaved manner as a forward predicted encoded picture chain in a preceding group of pictures and missing pictures in the forward predicted encoded picture chain in said current group of pictures were included in an interleaved manner as a backward predicted encoded picture chain in a following group of pictures, said method comprising the steps of:
    intra decoding said intra encoded picture of said current group of pictures;
    backward predicted decoding said backward predicted encoded pictures of said current group of pictures, starting from said intra decoded picture of said current group of pictures, and forward predicted decoding said forward predicted encoded pictures of said current group of pictures, starting from said intra decoded picture of said current group of pictures, wherein the pictures omitted in the encoding are also omitted in the decoding, and
    for providing the decoded video sequence output signal, assembling the correspondingly decoded pictures of said current group of pictures and the correspondingly decoded and interleaved pictures of adjacent groups of pictures in the original picture order of said video sequence.

8. The method according to claim 7, wherein said interleaving is uneven.

9. The method according to claim 7, wherein said forward and backward predicted encoded picture chains include bi-directionally predicted encoded pictures.

10. The method according to claim 7 wherein, if at least one picture in said backward or forward predicted encoded picture chains is received with errors, the remaining pictures in the corresponding prediction chain are not decoded but the decoding continues with the following intra encoded picture.

11. The method according to claim 10, wherein the frame rate of said decoded output signal is adapted correspondingly.

12. The method according to claim 7 wherein, if at least one picture in said backward or forward predicted encoded picture chains is received with errors, the remaining pictures in the corresponding prediction chain are not decoded but concealed or interpolated using the corresponding interleaved decoded pictures from the adjacent group of pictures.

13. An apparatus for encoding groups of pictures of a video sequence, each of said groups of pictures including a single intra encoded picture and more than two predicted encoded pictures located in backward direction as well as in forward direction from said single intra encoded picture, said apparatus comprising:
    means for intra encoding said picture to be intra encoded of a current group of pictures;
    means for backward predicted encoding a first part of said predicted encoded pictures of said current group of pictures, starting from said intra encoded picture of said current group of pictures, and for forward predicted encoding the other part of said predicted encoded pictures of said current group of pictures, starting from said intra encoded picture of said current group of pictures, whereby pictures are omitted in these forward and backward predicted encoded picture chains, and
    means for arranging every two adjacent groups of pictures of said video sequence in an overlapping manner such that missing pictures in the backward predicted encoded picture chain in said current group of pictures are included in an interleaved manner as a forward predicted encoded picture chain in a preceding group of pictures, and missing pictures in the forward predicted encoded picture chain in said current group of pictures are included in an interleaved manner as a backward predicted encoded picture chain in a following group of pictures.

14. The apparatus according to claim 13, wherein said interleaving is uneven.

15. The apparatus according to claim 13, wherein said forward and backward predicted encoded picture chains include bi-directionally predicted encoded pictures.

16. The apparatus according to claim 13 wherein, if at least one picture in said backward or forward predicted encoded picture chains is received with errors, the remaining pictures in the corresponding prediction chain are not decoded but the decoding continues with the following intra encoded picture.

17. The apparatus according to claim 16, wherein the frame rate of said decoded output signal is adapted correspondingly.

18. The apparatus according to claim 13 wherein, if at least one picture in said backward or forward predicted encoded picture chains is received with errors, the remaining pictures in the corresponding prediction chain are not decoded but concealed or interpolated using the corresponding interleaved decoded pictures from the adjacent group of pictures.

19. An apparatus for decoding groups of pictures of a video sequence, each of said groups of pictures including a single intra encoded picture and more than two predicted encoded pictures located in backward direction as well as in forward direction from said single intra encoded picture, wherein a single picture to be intra encoded of a current group of pictures was intra encoded and a first part of predicted encoded pictures of a current group of pictures was backward predicted encoded starting from said intra encoded picture of said current group of pictures, and an other part of said predicted encoded pictures of said current group of pictures was forward predicted encoded starting from said intra encoded picture of said current group of pictures, whereby pictures were omitted in these forward and backward predicted encoded picture chains and whereby every two adjacent groups of pictures of said video sequence were arranged in an overlapping manner such that missing pictures in the backward predicted encoded picture chain in said current group of pictures were included in an interleaved manner as a forward predicted encoded picture chain in a preceding group of pictures and missing pictures in the forward predicted encoded picture chain in said current group of pictures were included in an interleaved manner as a backward predicted encoded picture chain in a following group of pictures, said apparatus comprising:

means for intra decoding said intra encoded picture of said group of pictures;

means for backward predicted decoding said backward predicted encoded pictures of said current group of pictures, starting from said intra decoded picture of said current group of pictures, and for forward predicted decoding said forward predicted encoded pictures of said current group of pictures, starting from said intra decoded picture of said current group of pictures, where the pictures omitted in the encoding are also omitted in the decoding, and means for providing the decoded video sequence output signal, assembling the correspondingly decoded pictures of said current group of pictures and the correspondingly decoded and interleaved pictures of adjacent groups of pictures in the original picture order of said video sequence.

20. The apparatus according to claim 19, wherein said interleaving is uneven.

21. The apparatus according to claim 19, wherein said forward and backward predicted encoded picture chains include bi-directionally predicted encoded pictures.

22. The apparatus according to claim 19 wherein, if at least one picture in said backward or forward predicted encoded picture chains is received with errors, the remaining pictures in the corresponding prediction chain are not decoded but the decoding continues with the following intra encoded picture.

23. The apparatus according to claim 22, wherein the frame rate of said decoded output signal is adapted correspondingly.

24. The apparatus according to claim 19 wherein, if at least one picture in said backward or forward predicted encoded picture chains is received with errors, the remaining pictures in the corresponding prediction chain are not decoded but concealed or interpolated using the corresponding interleaved decoded pictures from the adjacent group of pictures.

* * * * *